(12) United States Patent
Peyravian et al.

(10) Patent No.: US 6,363,154 B1
(45) Date of Patent: Mar. 26, 2002

(54) DECENTRALIZED SYSTEMS METHODS AND COMPUTER PROGRAM PRODUCTS FOR SENDING SECURE MESSAGES AMONG A GROUP OF NODES

(75) Inventors: Mohammad Peyravian, Cary, NC (US); Stephen Michael Matyas, Jr., Manassas, VA (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,631

(22) Filed: Oct. 28, 1998

(51) Int. Cl.[7] .................................................. H04L 9/08
(52) U.S. Cl. ...................................................... 380/283
(58) Field of Search ................................. 713/151, 171, 713/180; 380/44, 47, 273, 283, 284, 285; 705/71

(56) References Cited

U.S. PATENT DOCUMENTS

| | | | |
|---|---|---|---|
| 4,200,770 A | 4/1980 | Hellman et al. | 178/22 |
| 4,218,582 A | 8/1980 | Hellman et al. | 178/22 |
| 4,405,829 A | 9/1983 | Rivest et al. | 178/22.1 |
| 4,424,414 A | 1/1984 | Hellman et al. | 178/22.11 |
| 5,323,464 A | 6/1994 | Elander et al. | 380/24 |
| 5,748,736 A * | 5/1998 | Mittra | 713/163 |
| 5,805,705 A | 9/1998 | Gray et al. | 380/48 |
| 5,905,871 A * | 5/1999 | Buskens et al. | 709/245 |
| 6,038,322 A * | 3/2000 | Harkins | 380/279 |
| 6,215,878 B1 * | 4/2001 | Harkins | 380/281 |

FOREIGN PATENT DOCUMENTS

| WO | WO-0059154 | * 10/2000 |
|---|---|---|

OTHER PUBLICATIONS

Ballardie, "Scalable Multicast Key Distribution", IETF RFC–1949, May 1996.

Harney et al., "Group Key Management Protocol (GKMP) Specification", IETF RFC–2093, Jul. 1997.

(List continued on next page.)

*Primary Examiner*—Albert Decady
*Assistant Examiner*—Matthew Smithers
(74) *Attorney, Agent, or Firm*—Myers Bigel Sibley & Sajovec, P.A.; Jeanine S. Ray-Yarletts

(57) ABSTRACT

Secure messages are sent among a group of nodes selected from a plurality of nodes that are connected to a communications network, by defining a random secret key at a first one of the group of nodes. The random secret key is sent from the first one of the group nodes to remaining ones of the group of nodes. A random number is generated at a second one of the group of nodes. A one-way hash of the random number and the random secret key is performed at the second one of the group of nodes to generate a working key. A message is encrypted at the second one of the group of nodes, using the working key. The encrypted message and the random number is sent from the second one of the group of nodes to remaining ones of the group of nodes. The encrypted message and the random number are received at the remaining ones of the group of nodes. Each of the remaining ones of the group of nodes performs a one-way hash of the random number and the random secret key, to regenerate the working key. The message is then decrypted using the regenerated working key. The secret key may be defined at any one of the group of nodes rather than a predefined, centralized key distribution center. Moreover, the random number may be generated at any one of the group of nodes that desires to communicate an encrypted message to remaining ones of the group of nodes. Decentralized group key management is thereby provided.

21 Claims, 3 Drawing Sheets

OTHER PUBLICATIONS

Harney et al., "Group Key Management Protocol (GKMP) Architecture", IETF RFC–2093, Jul. 1997.

American National Standards Institute, "Key Management Extensions", ANSI X9.69, 1998.

Accredited Standards Committee X9, "X9.69 Key Management Extensions", American Bankers Association, Aug. 6, 1998.

Harney et al., "Group Key Management Protocol (GKMP) Specification", IETF RFC–2098, Jul. 1997.

Harney et al., "Group Key Management Protocol (GKMP) Architecture", IETF RFC–2094, Jul. 1997.

Rivest, "The RC5 Encryption Algorithm", Dr. Dobb's Journal, Jan. 1995, pp. 146–152.

Massey, "SAFER K–64: A Byte–Oriented Block–Ciphering Algorithm", Fast Software Encryption, Cambridge Security Workshop Proc., Springer–Verlag, 1994, pp. 1–17.

Schneier, "The Blowfish Encryption Algorithm", Dr. Dobb's Journal, Apr. 1994, pp. 38, 40.

Johnson et al., "The Commercial Data Masking Facility (CDMF) Data Privacy Algorithm", IBM J. Res. Development, vol. 38, No. 2, Mar. 1994, pp. 217–226.

Schneier, "The IDEA Encryption Algorithm", Dr. Dobb's Journal, Dec. 1993, pp. 50, 52, 54, 56, 106.

* cited by examiner

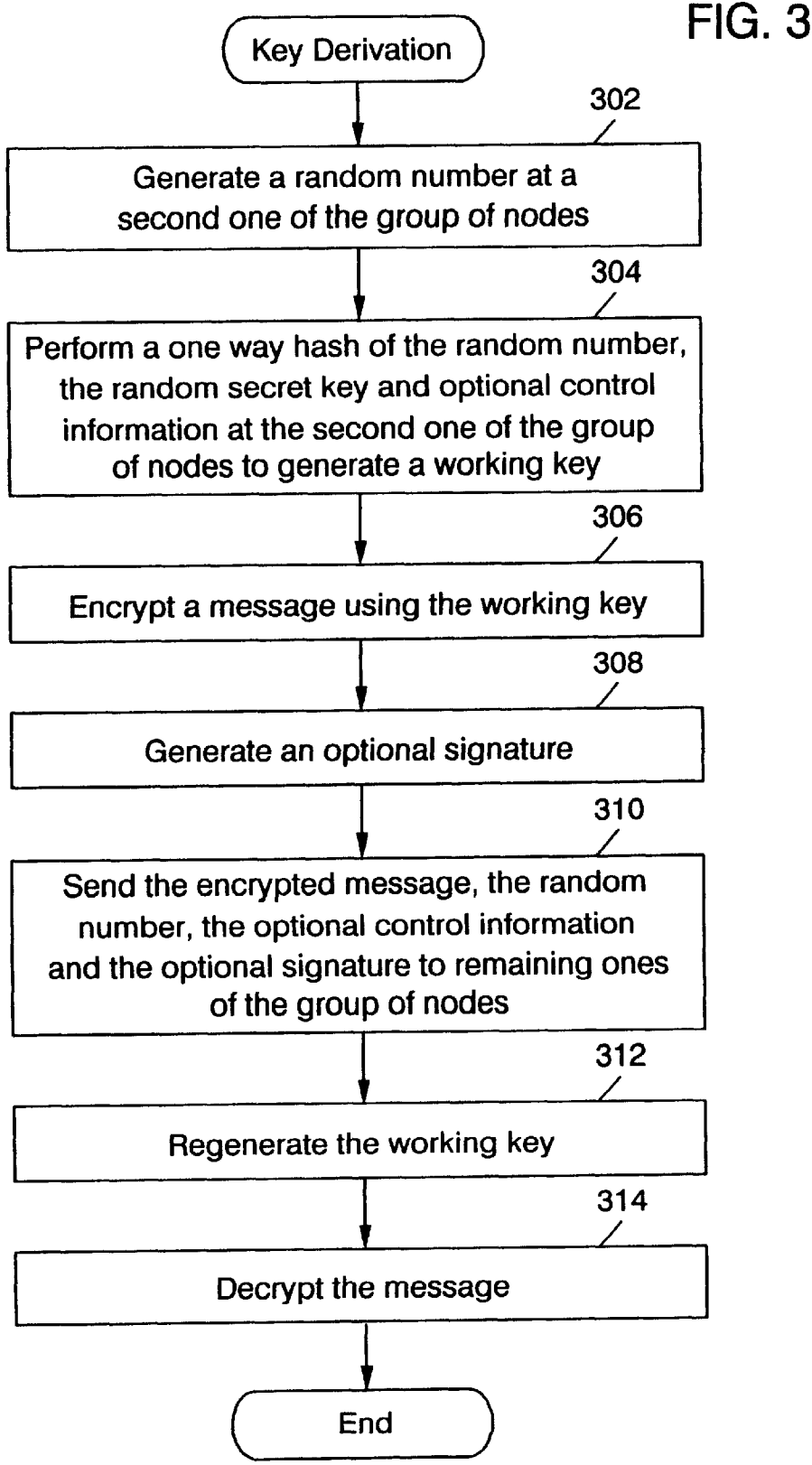

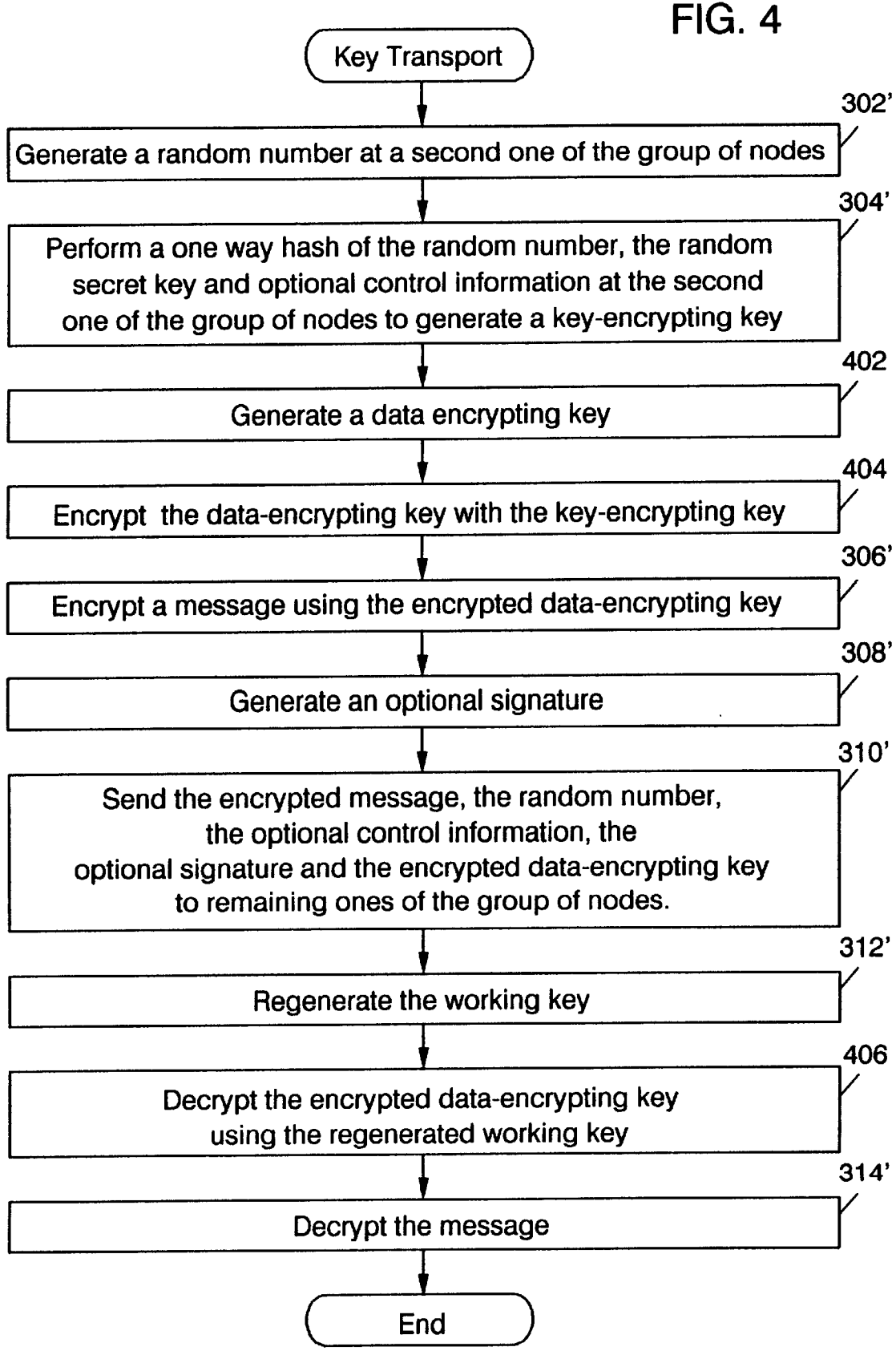

DECENTRALIZED SYSTEMS METHODS AND COMPUTER PROGRAM PRODUCTS FOR SENDING SECURE MESSAGES AMONG A GROUP OF NODES

FIELD OF THE INVENTION

This invention relates to systems, methods and computer program products for communicating among nodes that are connected to a communications network, and more particularly to systems, methods and computer program products for sending and receiving secure messages among nodes that are connected to a communications network.

BACKGROUND OF THE INVENTION

Communications networks are widely used to send and receive messages among nodes that are connected thereto. Communications networks may include wired and wireless communications networks, local area networks, the Internet, buses that connect two or more nodes, and combinations thereof. Nodes may include mainframe, mid-range and personal computers, workstations, radiotelephones, application programs such as client and server programs, devices such as smart cards and cryptographic adapters, and combinations thereof. In network communications, data may be encrypted selectively, ancrypted may stay end until it is decrypted by the intended recipient or recipients.

Encryption often occurs between two communicating nodes: a single sender and a single receiver. However, there are situations where messages are communicated to multiple other nodes, or data is shared with multiple other nodes. For example, a user may wish to send an encrypted email message to several other users, whose email addresses are contained in a distribution list. Alternatively, a user may wish to send an encrypted document, attached to an email message, to several other users.

Existing key derivation and key transport protocols, which may work well between two communicating nodes, may not work as well when there are multiple recipients. For example, the sender of an email message can separately encrypt the data key that is used to encrypt the data, in the public key of each recipient. However, if users in this closed group will have a subsequent need to communicate or share additional encrypted messages or documents with other users of the same group, the above-described method of encrypting the data-encrypting keys in the public key of each recipient may not be an efficient or effective solution, because the method may not scale well.

Other conventional mechanisms for generating and distributing group symmetric keys may rely on a Key Distribution Center (KDC) to manage the setup of symmetric keys. A group key request may be sent to the KDC. The KDC then contacts each group member and distributes the symmetric key. The group members can then secure group communication.

For example, A. Ballardie, "*Scalable Multicast Key Distribution*", IETF RFC-1949, May 1996, defines a multicast key distribution method using a "core based tree" multicast scheme. In a group of communicating users, a delivery multicast tree is built around several core members. One of the core members is assigned the role of primary core and the group key distribution center. Once the core based tree is established, the primary core member (i.e., the group key distribution center) creates a group key, encrypts it with each core public key and sends it to the core members. After receiving the group key, each core member then encrypts the group key with the public keys of its subordinates and sends it to them. When a group member wants to send an encrypted message to other members, it sends a request to the primary core. The primary core creates a session key (i.e., a data encrypting key), encrypts it with the group key, and sends it to secondary cores for distribution to group members over the core based tree.

Similarly, Harney et al., "*Group Key Management Protocol (GKMP) Specification*", IETF RFC-2093, July 1997, and "*Group Key Management Protocol (GKMP) Architecture*", IETF RFC-2094, July 1997, define a group key management protocol to create group symmetric keys and distribute them among group members. A "group controller" creates a "group traffic encrypting key", encrypts it with each member's public key, and sends it to the group members. Then, the group controller contacts each member of the group and creates a "session traffic encrypting key" for that member. When a group member wants to send an encrypted message to other members, it encrypts the message using its session traffic encrypting key.

Finally, ANSI X9.69, "*Key Management Extensions*", 1998, defines a role-based key management scheme for distribution of symmetric keys. A policy manager defines one or more "domains" with each being specified by a "Domain Authority" (DA). Three symmetric keys are used to generate "working keys". These are "Domain Key Split", "Maintenance Key Split", and "Random Key Split". A DA generates two symmetric keys: a Domain Key Split and a Maintenance Key Split. The DA sends these two keys to all the users in its domain. The Maintenance Key Split is used to update the Domain Key Split. To encrypt a message a "Working Key" is derived from the three symmetric keys. The message is encrypted with the Working Key.

Notwithstanding the above-described mechanisms for generating and distributing group symmetric keys, there continues to be a need for systems, methods and computer program products for sending secure message among a group of nodes selected from a plurality of nodes that are connected to a communications network.

SUMMARY OF THE INVENTION

The present invention provides systems, methods and/or computer program products for sending secure messages among a group of nodes selected from a plurality of nodes that are connected to a communications network, by defining a group key at any one of the group of nodes. The group key is then sent to remaining ones of the group of nodes. A message is encrypted at any one of the group of nodes using a session key that is generated from the group key. The encrypted message is sent to remaining ones of the group of nodes.

Accordingly, scaleable systems, methods and/or computer program products can create and distribute symmetric keys among a group of communicating nodes. Unlike conventional group key management mechanisms, the present invention need not use a centralized key distribution center—only the group members may generate and distribute group symmetric keys. The group symmetric keys permit each node to conveniently and securely communicate, share, and access data belonging to the group. A group of communicating nodes can thus send secure messages to the group members without having to send the session key individually to each node.

More specifically, systems, methods and/or computer program products for sending secure messages among a group of nodes selected from a plurality of nodes that are connected to a communications network, define a random secret key at a first one of the group of nodes. The random secret key is sent from the first one of the group nodes to remaining ones of the group of nodes. A random number is generated at a second one of the group of nodes. A one-way hash of the random number and the random secret key is performed at the second one of the group of nodes to generate a working key. A message is encrypted at the second one of the group of nodes, using the working key. The encrypted message and the random number is sent from the second one of the group of nodes to remaining ones of the group of nodes.

The encrypted message and the random number are received at the remaining ones of the group of nodes. Each of the remaining ones of the group of nodes performs a one-way hash of the random number and the random secret key, to regenerate the working key. The message is then decrypted using the regenerated working key. It will be understood that the secret key may be defined at any one of the group of nodes rather than a predefined, centralized key distribution center. Moreover, the random number may be generated at any one of the group of nodes that desires to communicate an encrypted message to remaining ones of the group of nodes. Decentralized group key management is thereby provided.

Key transport may also be performed by generating a data encrypting key at the second one of the group of nodes and encrypting the data encrypting key with the working key. Encryption of the message is then performed by encrypting a message at the second one of the group of nodes, using the data encrypting key. The encrypted data encrypting key is sent along with the encrypted message and the random number, from the second one of the group of nodes to remaining ones of the group of nodes. At the remaining ones of the group of nodes, a one-way hash of the random number and the random secret key is performed to regenerate the working key. The encrypted data encrypting key is decrypted using the regenerated working key. The message is decrypted using the data encrypting key.

Control information including an identification of the group of nodes, an identification of the second one of the group of nodes and an identification of permitted uses of the working key, may also be sent along with the messages. A one-way hash is performed of the random number, the random secret key and the control information at the second one of the group of nodes, to generate a working key. Then, the encrypted message, the random number and the control information are sent from the second one of the group of nodes to remaining ones of the group of nodes.

Finally, a signature may also be sent along with the encrypted message and the random number. In particular, a signature is generated by encrypting a one-way hash of the random number and control information with a private key of the second one of the group of nodes. Then, the encrypted message, the random number, the control information and the signature are sent from the second one of the group of nodes to remaining ones of the group of nodes. It will also be understood that both control information and a signature may be sent.

In order to define a random secret key and also send encrypted messages, each node in the group of nodes includes means for defining a random secret key, means for sending the random secret key to the group of nodes, means for generating a random number, means for performing a one-way hash of the random number and the random secret key to generate a working key, means for encrypting a message using a working key and means for sending the encrypted message and the random number to the group of nodes. Each node also includes means for decrypting the message using the regenerated working key. Each node may also include means for generating a data encrypting key, and means for encrypting the data encrypting key with the working key. Each node may also include control information and/or a signature. Each of the above-described means may be embodied as hardware, software or combinations thereof.

BRIEF DESCRIPTION OF THE DRAWINGS

FIG. 3 is a flowchart illustrating sending messages using key derivation according to the present invention.

FIG. 4 is a flowchart illustrating sending messages using key transport according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computerreadable program code means embodied in the medium. Any suitable computer readable medium may be utilized including hard disks, CD-ROMs, optical storage devices, or magnetic storage devices.

Various aspects of the present invention are illustrated in detail in the following Figures, including flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computerreadable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 1:
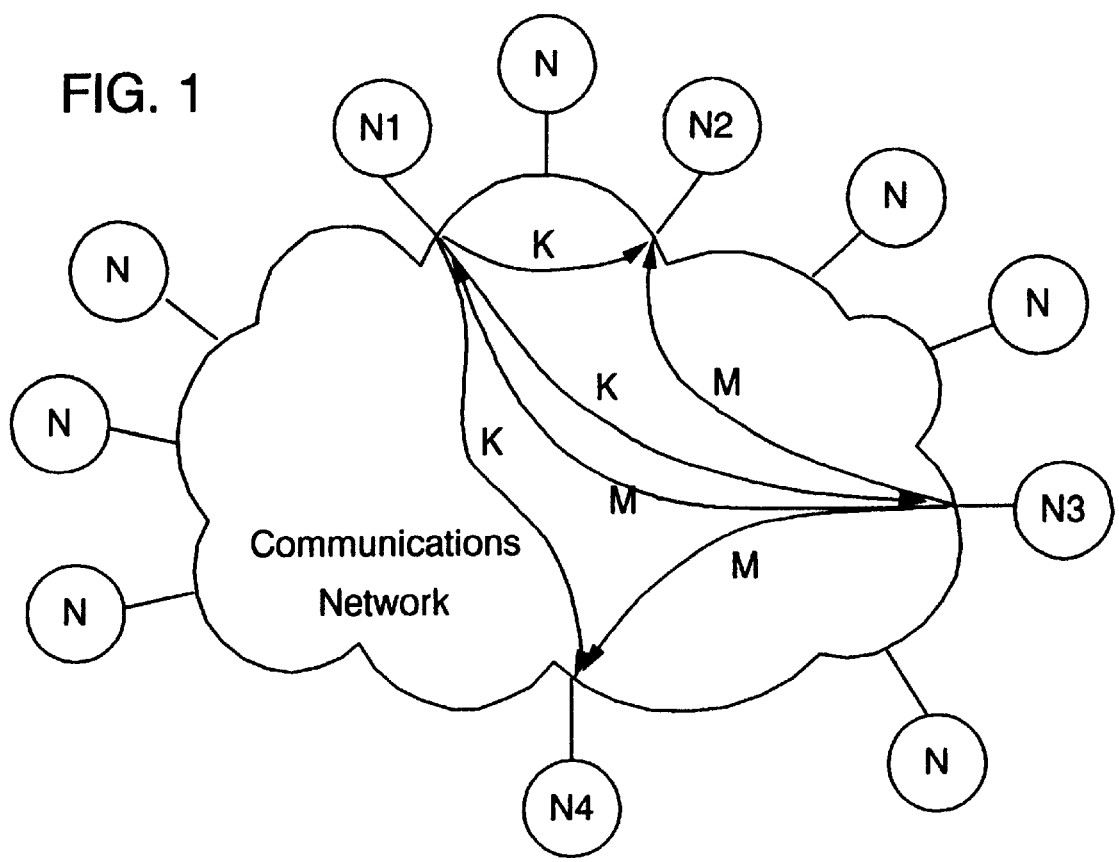
FIG. 1 illustrates decentralized systems, methods and computer program products for sending secure messages among a group of nodes according to the present invention.

FIG. 1 illustrates decentralized systems, methods and/or computer program products for sending secure messages among a group of nodes according to the present invention. As shown in FIG. 1, a group of nodes $N_1$–$N_4$ that are selected from a plurality of nodes N that are connected to a communications network, send and receive secure messages thereamong. Communications networks may include wired and wireless communications networks, local area networks, the Internet, buses that connect two or more nodes, and combinations thereof. Nodes may include mainframe, midrange and personal computers, workstations, radiotelephones, application programs such as client and server programs, devices such as smart cards and cryptographic adapters, and combinations thereof.

More specifically, a group key K may be defined at any one of the group of nodes, for example node $N_1$. The group key is sent to remaining ones of the group nodes, for example nodes $N_2$–$N_4$. A message M is encrypted at any one of the group of nodes, for example node $N_3$, using a session key that is generated from the group key K and a random value n. The encrypted message along with the random value is sent to remaining ones of the group of nodes, for example nodes $N_1$, $N_2$ and $N_4$. At the remaining ones of the group of nodes $N_1$, $N_2$ and $N_4$, the session key is regenerated and the message M is decrypted using the regenerated session key.

Accordingly, once a group key K has been generated and provided to each member in the group, key distribution can be accomplished using the group key. Decentralized group key management can use both symmetric- and asymmetric-key cryptography. The decentralized group key management can be used where a group of users, such as the members of a work group engaged in a common work activity, have a need to securely communicate or share information.

When a node N desires to communicate with a number of other nodes for the first time, the node defines the group members and establishes a shared secret key K among the group members. This node is called the "Group Manager" (GM). The GM may be any group member, but with an additional role of defining the initial group members and establishing a shared secret key K among the group members.

The GM sets up the original group key. However, after the initial group definition and group key setup, any group member is empowered to extend the group and to refresh the group key. Any group member can share the group key with others outside the group in order to extend or enlarge the group, as new members join. Any group member can periodically update the shared secret key by generating a new random shared secret key K and sending it to every member as the GM did initially. This may be performed if a member leaves the group. However, if a new member is added to the group, the existing group key K only need to be shared with the new member.

Groups may be created from a large set of nodes that already have the ability to communicate using key management involving public-key cryptography to establish a shared secret key between two nodes. In this existing environment, the present invention can permit any node in this large set of nodes to assume the role of a GM, to define a group of nodes, and to establish a group key among this group of nodes. Once that has been accomplished, the GM role is no longer required and any node in the group can create a session key to be shared with other members of the group. The groups can come and go and they can overlap. Establishing such groups in a large community of users who communicate using an email system such as Lotus Notes, where new projects cause users to form working groups to solve their workrelated work projects, can be simple and convenient.

The present invention may be distinguished from conventional group key management mechanisms in at least the following ways. For example, in IETF RFC-1949 cited above, the role of primary core is assigned by an external entity. The domain authority in ANSI X9.69 cited above is also assigned by an external entity and has a continuing role of maintaining the group. In contrast, a GM of the present invention assumes the role of GM through self-empowerment. The primary core member also has a continuing role, whereas the GM need not. The primary core creates a session key for each new session. In the present invention, nodes rather than the GM create the session keys and distribute them with the encrypted messages. Thus, the need to constantly return to the primary core member in order to get a session key may be eliminated.

Finally, in IETF RFC 2093-4 cited above, the group controller is responsible for establishing a group session traffic encrypting key. It may be disadvantageous to have the group controller be responsible for setting up the session keys. In contrast, the present invention can allow the GM to establish the initial group members and group key. Thereafter, any group member may be empowered to extend the group and to refresh the group key.

Figure 2:
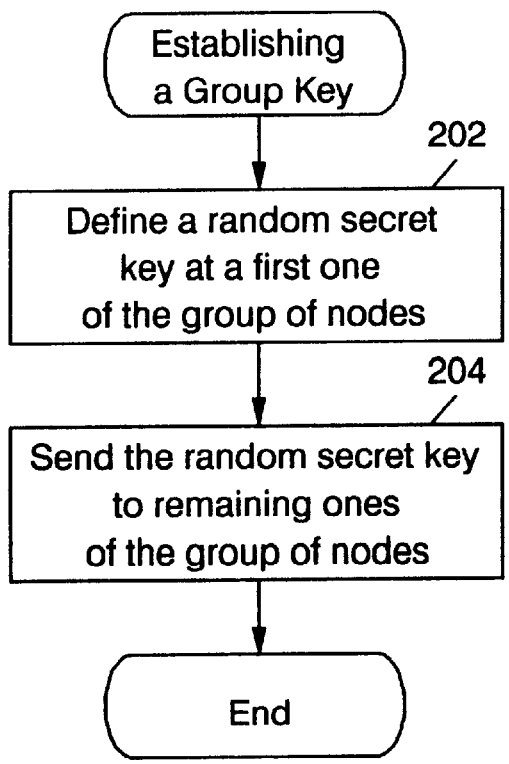
FIG. 2 is a flowchart illustrating establishing a group key according to the present invention.

Referring now to FIG. 2, establishing a group key, also referred to as a random secret key K, will now be described. At Block 202, any group member such as the GM or a group member wanting to refresh the group key, generates a random secret key K, and sends it to every other member in the group at Block 204.

The distribution of the group key K to each node in the group can be accomplished in several different ways. For example, the secret key K sending node may encrypt K under the public key of the receiver and sign this encrypted value using the sender's private signature generation key. Alternatively, the secret key K sending node may use a conventional Diffie-Hellman key establishment protocol to first establish a common shared secret key with the user and then encrypt K under the shared secret key using a symmetric-key algorithm. Other techniques may also be used.

After a long-term group key K has been established among the group of communicating nodes, any group member can send secure messages to all other group members without having to send the session key individually to each group member as will be described below. Once a shared secret key K is established, two embodiments may be used to communicate securely: a "key derivation" and a "key transport". These two embodiments will now be described.

FIG. 3 illustrates sending messages using key derivation. In key derivation, once the shared secret key K is established, any group node that wants to send an encrypted message to other nodes generates a random value (number) n at Block 302. A working key S is generated at Block 304 using the following formula:

S=SHA-1 (Control_Information, K, n)

where Control_Information is optional non-secret information such as group-related or key related information. For example, the control information may include the User_ID of the group member that generated S, a Group_ID or label identifying or defining the group, and a key usage vector specifying the permitted uses of S. Any strong collision-resistant one-way hash function can be used in the above formula. The well known SHA-1 hash function is used as an example in the above formula.

Continuing with the description of FIG. 3, the message is encrypted with S at Block 306. If the group desires that the sender of a message be authenticated, an optional signature (Sig) is generated at Block 308 using the following formula:

Sig=eSK(SHA-1 (Control_Information, n))

where SK is the private key of the sender and eSK( ) denotes encryption with SK. When the sender's signature is desired, a specific n should not be used more than once by a given sender. Otherwise, authentication of the sender may not be guaranteed.

At Block 310, the encrypted message along with the Control_Information, the random value n, and the signature Sig (when used) are sent to each remaining group member. In some cases the recipients may know the value of some of the control information, in which case that portion of the control information need not be sent.

At Block 312, knowing the Control_Information and n, the group members can generate S to decrypt the message since they already know the group key K. A one way hash of the random number, and control information and the random secret key is performed to regenerate the working key. Then, at Block 314, the message is decrypted using the regenerated working key.

FIG. 4 illustrates sending messages using key transport. In key transport, once the shared secret key K is established, any group node that wishes to send an encrypted message to other nodes generates a random value (number n) at Block 302', similar to Block 302 of FIG. 3. A key-encrypting key KK is generated at Block 304', similar to the working key S at Block 304, using the following formula:

KK=SHA-1 (Control_Information, K, n)

Then, at Block 402, a random data-encrypting key KD is generated. At Block 404, the data-encrypting key KD is encrypted with the key-encrypting key KK. The encrypted KD is denoted by eKK(KD).

At Block 306', the message is encrypted with KD, similar to Block 306 of FIG. 3. If the group desires that the sender of a message be authenticated, a signature (Sig) is generated by Block 308' using the following formula:

Sig=eSK(SHA-1 (Control_Information, n))

Then, at Block 310', the encrypted message along with the Control_Information, the random value n, the encrypted data-encrypting key eKK(KD), and the signature Sig (when used) are sent to each remaining group member, similar to Block 310 of FIG. 3.

At Block 312', knowing the Control_Information and n, the group members can generate KD to decrypt the message, similar to Block 312 of FIG. 3. A one way hash of the random number n and the shared secret key K is performed to regenerate the working key KK. Then, at Block 406, the encrypted data encrypting key eKK(KD) is decrypted using the regenerated working key KK. Finally, at Block 314', the message is decrypted using the decrypted data encryption key, similar to Block 314 of FIG. 3.

Accordingly, symmetric keys are created among a group of communicating nodes. Unlike conventional group key management mechanisms, the present invention does not require the use of a centralized key distribution center. The group members themselves can generate and distribute group symmetric keys. The invention can be applied to any number of nodes and scales well because a central authority is not needed. The group symmetric keys can permit each node to conveniently and securely communicate, share, and access data belonging to the group. The invention can allow a group of communicating peers to send secure messages to the group members without having to send the session key individually to each member. Moreover, it can provide perfect forward secrecy for messages. That is, if a data encrypting key or a key encrypting key associated with a message is compromised, only that specific message is exposed and not other messages.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of sending secure messages among a group of nodes selected from a plurality of nodes that are connected to a communications network, the method comprising the steps of:

defining a random secret key at a first one of the group of nodes;

sending the random secret key from the first one of the group of nodes to remaining ones of the group of nodes;

generating a random number at a second one of the group of nodes;

performing a one way hash of the random number and the random secret key at the second one of the group of nodes to generate a working key;

encrypting a message at the second one of the group of nodes, using the working key; and sending the encrypted message and the random number from the second one of the group of nodes to remaining ones of the group of nodes.

2. A method according to claim 1 further comprising the following steps that are performed at the remaining ones of the group of nodes:

performing a one way hash of the random number and the random secret key to regenerate the working key; and decrypting the message using the regenerated working key.

3. A method according to claim 1 wherein the following steps are performed at the second one of the group of nodes, between the steps of performing a one way hash and encrypting a message:

generating a data encrypting key; and encrypting the data encrypting key with the working key;

wherein the step of encrypting a message comprises the step of encrypting a message at the second one of the group of nodes, using the encrypted data encrypting key; and wherein the step of sending the encrypted message comprises the step of sending the encrypted message, the random number and the encrypted data encrypting key from the second one of the group of nodes to remaining ones of the group of nodes.

4. A method according to claim 3 further comprising the following steps that are performed at the remaining ones of the group of nodes:
  performing a one way hash of the random number and the random secret key to regenerate the working key;
  decrypting the encrypted data encrypting key using the regenerated working key; and
  decrypting the message using the decrypted encrypted data encrypting key.

5. A method according to claim 1:
  wherein the step of performing a one way hash comprises the step of performing a one way hash of the random number, the random secret key and control information at the second one of the group of nodes to generate a working key; and
  wherein the step of sending comprises the step of sending the encrypted message, the random number and the control information from the second one of the group of nodes to remaining ones of the group of nodes.

6. A method according to claim 1 wherein the following step is performed prior to the step of sending:
  generating a signature by encrypting a one way hash of the random number with a private key of the second one of the group of nodes; and
  wherein the step of sending comprises the step of sending the encrypted message, the random number and the signature from the second one of the group of nodes to remaining ones of the group of nodes.

7. A method according to claim 5 wherein the control information is at least one of an identification of the group of nodes, an identification of the second one of the group of nodes and an identification of permitted uses of the working key.

8. A group of nodes selected from a plurality of nodes that are connected to a communications network, the group of nodes sending secure messages to one another, each node in the group of nodes comprising:
  means for defining a random secret key;
  means for sending the random secret key to the group of nodes;
  means for generating a random number;
  means for performing a one way hash of the random number and the random secret key to generate a working key;
  means for encrypting a message using the working key; and
  means for sending the encrypted message and the random number to the group of nodes.

9. A group of nodes according to claim 8, wherein each node further comprises:
  means for decrypting the message using the regenerated working key.

10. A group of nodes according to claim 8, wherein each node further comprises:
  means for generating a data encrypting key; and
  means for encrypting the data encrypting key with the working key;
  wherein the means for encrypting a message comprises means for encrypting a message using the data encrypting key; and
  wherein the means for sending the encrypted message comprises means for sending the encrypted message, the random number and the encrypted data encrypting key to the group of nodes.

11. A group of nodes according to claim 10, wherein each node further comprises:
  means for decrypting the encrypted data encrypting key using the regenerated working key; and
  means for decrypting the message using the decrypted data encrypting key.

12. A group of nodes according to claim 8:
  wherein the means for performing a one way hash comprises means for performing a one way hash of the random number, the random secret key and control information at the second one of the group of nodes to generate a working key; and
  wherein the means for sending comprises means for sending the encrypted message, the random number and the control information to the group of nodes.

13. A group of nodes according to claim 8, wherein each node further comprises:
  means for generating a signature by encrypting a one way hash of the random number with a private key of the node; and
  wherein the means for sending comprises means for sending the encrypted message, the random number and the signature to the group of nodes.

14. A group of nodes according to claim 12 wherein the control information is at least one of an identification of the group of nodes, an identification of the node and an identification of permitted uses of the working key.

15. A computer program product that sends secure messages to a group of nodes selected from a plurality of nodes that are connected to a communications network, the computer program product comprising a computer-readable storage medium having computer-readable program code means embodied in the medium, the computer-readable program code means comprising:
  computer-readable program code means for defining a random secret key;
  computer-readable program code means for sending the random secret key to the group of nodes,
  computer-readable program code means for generating a random number;
  computer-readable program code means for performing a one way hash of the random number and the random secret key to generate a working key;
  computer-readable program code means for encrypting a message using the working key; and
  computer-readable program code means for sending the encrypted message and the random number to the group of nodes.

16. A computer program product according to claim 15 further comprising:
  computer-readable program code means for decrypting the message using the regenerated working key.

17. A computer program product according to claim 15 further comprising:
  computer-readable program code means for generating a data encrypting key; and
  computer-readable program code means for encrypting the data encrypting key with the working key;
  wherein the computer-readable program code means for encrypting a message comprises computer-readable program code means for encrypting a message using the encrypted data encrypting key; and
  wherein the computer-readable program code means for sending the encrypted message comprises computerreadable program code means for sending the encrypted message, the random number and the encrypted data encrypting key to the group of nodes.

18. A computer program product according to claim, 17 further comprising:

computer-readable program code means for decrypting the encrypted data encrypting key using the regenerated working key; and computer-readable program code means for decrypting the message using the decrypted encrypted data encrypting key.

19. A computer program product according to claim 15:

wherein the computer-readable program code means for performing a one way hash comprises computer-readable program code means for performing a one way hash of the random number, the random secret key and control information at the second one of the group of nodes to generate a working key; and wherein the computer-readable program code means for sending comprises computer-readable program code means for sending the encrypted message, the random number and the control information to the group of nodes.

20. A computer program product according to claim 15 further comprising:

computer-readable program code means for generating a signature by encrypting a one way hash of the random number with a private key of the node; and wherein the computer-readable program code means for sending comprises computer-readable program code means for sending the encrypted message, the random number and the signature to the group of nodes.

21. A computer program product according to claim 19 wherein the control information is at least one of an identification of the group of nodes, an identification of the node and an identification of permitted uses of the working key.

* * * * *